Nov. 28, 1939.    A. R. THOMPSON    2,181,218
JUICE EXTRACTION METHOD
Filed Dec. 21, 1936

INVENTOR.
Albert R. Thompson
BY Philip A. Minnis
ATTORNEY

Patented Nov. 28, 1939

2,181,218

UNITED STATES PATENT OFFICE 2,181,218

JUICE EXTRACTION METHOD

Albert R. Thompson, Los Gatos, Calif., assignor to Food Machinery Corporation, San Jose, Calif., a corporation of Delaware Application December 21, 1936, Serial No. 117,003

5 Claims. (Cl. 146—219)

My invention relates to an improved method of juice extraction which is especially useful in extracting the juice from citrus fruits such as oranges and the like.

The extraction of juice from fruit of the above character offers several difficulties in obtaining a fruit juice which is free from the undesirable constituents of the rind and the rag content, which, when present, give the juice a more or less bitter taste and prevent its being kept for any length of time by causing it to turn rancid. Many attempts have been made to obtain a satisfactory orange juice, for example, which is entirely free from the oil in the rind and also free from the more or less bitter flavored rag constituents, but have been generally unsuccessful, principally because of the high volatility of the rind oil and the ease with which it can be expressed from the rind, and also because of the close proximity of the rag to the juice containing cells of the orange.

The present invention has for its general object the provision of a method which overcomes the difficulties noted above and produces an orange juice of good color and taste which is substantially entirely free of the undesirable foreign constituents of the orange rind and rag.

Another object of the invention is to provide a method of juice extraction which is applicable to the character of fruit noted above and which lends itself readily to quantity production of the juice.

Other objects will be apparent from the following description of my improved method as it is preferably carried out. The description will refer to oranges, however, it is to be understood that the method is equally applicable to other citrus fruits, such as lemons, limes and grapefruit.

Generally, my improved method contemplates the use of centrifugal force in separating the juice from the remaining constituents of the fruit. The oranges are cut preferably in halves transverse to the stem blossom axis, although they may be cut in different size segments, or in a different direction if desirable. The cut segment of orange is then placed in an apparatus for subjecting the segment to a centrifugal force, which may comprise basically a revoluble radius arm carrying a slotted or similar grate-like surface at the outer end to receive the orange segment with the cut surface of the orange segment engaging the grate-like surface and facing away from the axis of rotation. This positioning of the orange segment is important because the fruit juice itself is unobstructed as it flies outward other than by grate screening effect of the bars of the grate, while the oil of the rind has a tendency under the centrifugal action as the orange segment is revolved to penetrate further into the rind, rather than to be liberated with the juice. Other types of apertured surfaces may be employed, but I consider a grate-like surface preferable because it is less apt to become clogged, and apparently offers less obstruction to the juice.

After the segments of the orange are placed for rotation as described above, they are subjected to a centrifugal force as described above, the arm being rotated rapidly to effect translational rotation of the orange segments at a sufficiently high speed so that the centrifugal action on the juice carries it out from the rind and rag fibre which latter is sufficiently light that it will not be separated from the rag adhering to the rind, and, therefore, will not be carried with the juice. This will result in flattening of the rind against the grate surface, with the rag fibre stretched out through the grate openings, while the juice has been projected outwardly into a suitable receptacle.

Very good results have been obtained in which the orange segments are placed at the end of a 12" radius arm which is rotated at 1800 R. P. M. for a duration of from one-half to one minute, after which time substantially all of the juice will have been extracted. Only the very fine particles of pulp and color carrying matter which are in suspension in the juice will be carried through the screen with the juice. I have also extracted juice successfully with arms of from 8 to 10 inches in radius and with speeds up to 3600 R. P. M. However, I consider the higher speeds less desirable as the juice tends to mist, so that it is more difficult to confine and place in a container. Slower speeds and shorter arms than those noted above can also be used and the juice will come out, however, it will take a longer period of time, for this reason I prefer to use a centrifugal force of the character obtained by employing approximately a 12" radius arm which is rotated at approximately 1800 R. P. M.

One suitable form of apparatus which may be utilized to carry out the process described is illustrated in the accompanying drawing, in which.

Figure 1:
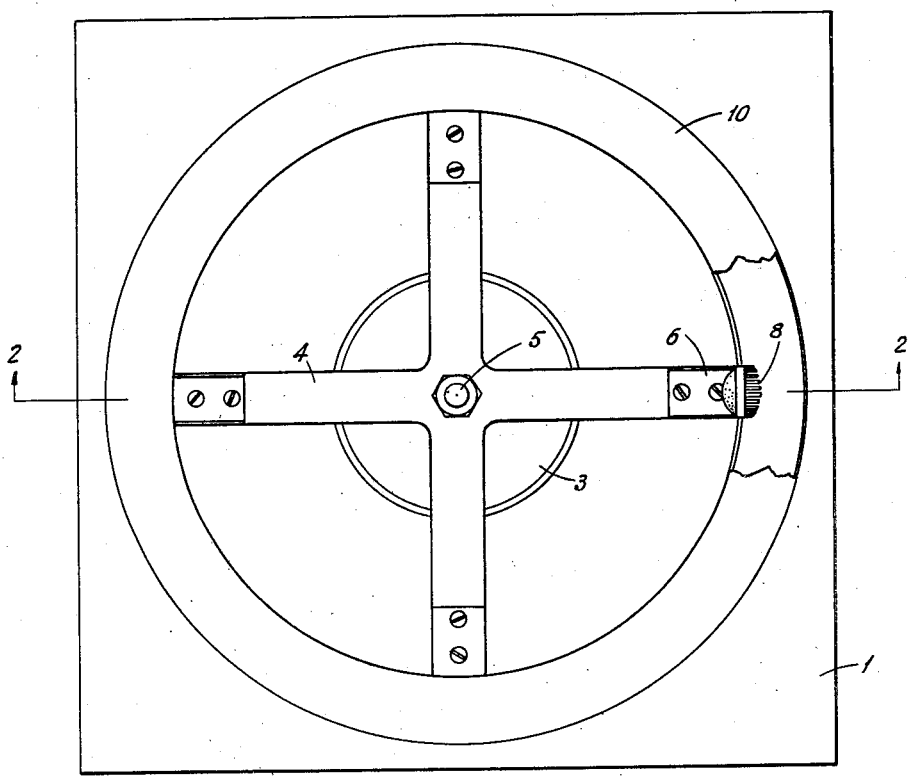
Fig. 1 is a plan view of the apparatus.
Figure 2:
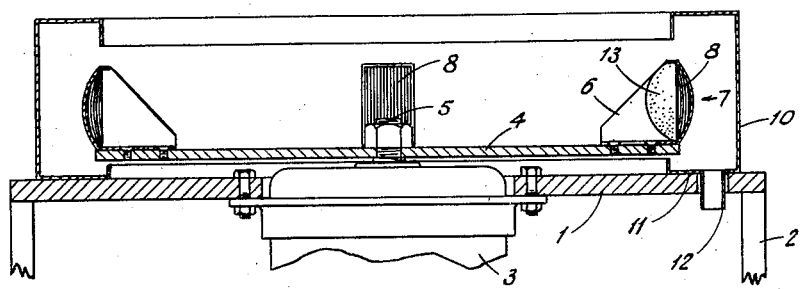
Fig. 2 is a sectional view thereof, taken along the line 2—2 of Fig. 1.
Figure 3:
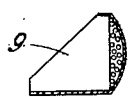
Fig. 3 is a side view of a modified form of fruit holder.
Figure 4:
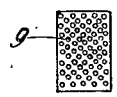
Fig. 4 is an end elevation of the fruit holder shown in Fig. 3.

In the apparatus illustrated, a table 1, provided with supporting legs 2, has an electric motor 3 centrally secured thereto, and a plurality of radially extending arms 4 are secured to the upper end of the vertically projecting armature shaft 5 of the motor. In the particular embodiment illustrated, four such arms are provided, but it will be understood that either two or any number more than two, may be used, if desired. Fruit holders 6 are secured to the outer ends of the arms 4 and are provided with grate like end walls 7. In the embodiment illustrated in Figs. 1 and 2, these end walls are made up of a series of spaced rods 8, but other forms of grate like surfaces may be provided, if desired, as for instance, the perforated construction of the end walls of the fruit holders 9 illustrated in Figs. 3 and 4.

Mounted on the table 1 and closely surrounding the circular path followed by the outer ends of the arms 4 is a channel shaped annular housing 10, which serves to catch the juice thrown outwardly from the fruit carried by the holders 6. The shape of the housing 10 is such as to provide a trough 11 in its bottom, which is provided with a discharge spout 12, through which the juice may be discharged to any suitable receptacle.

In operation, the fruit is first cut into segments, preferably halves. The fruit halves are then placed in the fruit holders as indicated at 13, with their cut faces against the apertured end walls of the fruit holders, in which position the flesh of the fruit faces away from the center of rotation of the holders. The motor is then operated to rapidly rotate the arms 4 at a sufficient rate, so that the resulting centrifugal force will liberate the juice from the fruit segments and throw it out through the apertures in the fruit holders, where it is caught by the housing 10 and discharged through the delivery spout 12. The grate-like surface of the fruit holders permits the passage of the juice while restraining the rind and rag fiber, which may be removed upon stopping the machine when the juice has been extracted from the fruit.

It will be understood that while the drawing illustrates but one form of apparatus, the method of my invention is not limited thereto, but may be carried out by other forms of apparatus. Also while I have described a preferred manner in which the method of my invention can be performed in connection with the extraction of orange juice, it is obvious that the steps thereof may be varied or modified, and can be applied to other fruit. I desire it to be understood, therefore, that the scope of my invention should be limited only by the scope of the appended claims.

I claim:

1. The method of extracting the juice of citrus fruit which includes the steps of cutting the fruit into segments, effecting a translatory movement of the segments over a confined circular path with the rind portion of the fruit segments facing the axis of rotation, said movement being at a rate sufficient to liberate the juice from the fruit under the action of the resulting centrifugal force, and restraining the rind portion of the segment against bodily radial movement during the translatory rotation of the segments.

2. The method of extracting the juice of citrus fruit which includes the steps of cutting the fruit into segments, and effecting a translatory movement of the segments over a confined circular path with the rind portion of the fruit segments facing the axis of rotation, said movement being at a rate sufficient to liberate the juice from the fruit under the action of the resulting centrifugal force.

3. The method of extracting the juice of citrus fruit which includes the steps of cutting the fruit into segments, and effecting a translatory movement of the segments over a confined circular path while holding the flesh thereof against an apertured surface with the rind portion of the fruit segments facing the axis of rotation, said movement being at a rate sufficient to liberate the juice from the fruit under the action of the resulting centrifugal force.

4. The method of extracting the juice of citrus fruit which includes the steps of cutting the fruit into segments, and subjecting the fruit segments to centrifugal force sufficient to liberate the juice therefrom and with the cut surfaces of the segments facing in the direction of the centrifugal force while restraining bodily movement of the rind and rag portions of the segment in the direction of such force.

5. The method of extracting the juice of citrus fruit which includes the steps of cutting the whole fruit into segments, subjecting the fruit segments to centrifugal force sufficient to liberate the juice therefrom while holding the flesh thereof against an apertured surface with the cut surfaces of the segments facing in the direction of the centrifugal force and the rind portion facing oppositely.

ALBERT R. THOMPSON.